United States Patent
Kang et al.

(10) Patent No.: US 10,326,937 B2
(45) Date of Patent: Jun. 18, 2019

(54) HORIZONTAL-POSTURE MAINTAINING APPARATUS

(71) Applicant: Samsung Electronics Co., Ltd., Suwon-si, Gyeonggi-do (KR)

(72) Inventors: Yoon-Seok Kang, Seoul (KR); Sung-Jin Park, Suwon-si (KR); Bae-Seok Lim, Suwon-si (KR); Bon-Min Koo, Seoul (KR); Jae-Kyu Shim, Suwon-si (KR); Woo-Jong Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 15/499,103

(22) Filed: Apr. 27, 2017

(65) Prior Publication Data
US 2017/0331999 A1    Nov. 16, 2017

(30) Foreign Application Priority Data
May 10, 2016    (KR) .................. 10-2016-0057081

(51) Int. Cl.
| | |
|---|---|
| *H04N 9/47* | (2006.01) |
| *H04N 7/18* | (2006.01) |
| *H04N 5/232* | (2006.01) |
| *B64C 39/02* | (2006.01) |
| *B64D 47/08* | (2006.01) |
| *F16M 11/12* | (2006.01) |
| *F16M 11/18* | (2006.01) |
| *F16M 13/02* | (2006.01) |

(Continued)

(52) U.S. Cl.
CPC ......... *H04N 5/2328* (2013.01); *B64C 39/024* (2013.01); *B64D 47/08* (2013.01); *F16M 11/121* (2013.01); *F16M 11/18* (2013.01); *F16M 13/02* (2013.01); *G03B 15/006* (2013.01); *G03B 17/561* (2013.01); *G03B 17/563* (2013.01); *G05D 1/0094* (2013.01); *H04N 5/2252* (2013.01); *H04N 5/2257* (2013.01); *H04N 5/23238* (2013.01); *H04N 5/23258* (2013.01); *H04N 5/23287* (2013.01); *H04N 5/23293* (2013.01); *B64C 2201/127* (2013.01); *B64C 2201/146* (2013.01)

(58) Field of Classification Search
None
See application file for complete search history.

(56) References Cited

U.S. PATENT DOCUMENTS

| | | | |
|---|---|---|---|
| 8,798,450 B2 | 8/2014 | Aicher et al. | |
| 2010/0171377 A1* | 7/2010 | Aicher | G01C 21/18 310/38 |
| 2016/0330436 A1* | 11/2016 | Jarok | H04N 17/002 |

FOREIGN PATENT DOCUMENTS

| | | |
|---|---|---|
| JP | 2003-222950 A | 8/2003 |
| KR | 10-1444130 B1 | 9/2014 |

* cited by examiner

*Primary Examiner* — Talha M Nawaz
(74) *Attorney, Agent, or Firm* — Jefferson IP Law, LLP

(57) ABSTRACT

A horizontal-posture maintaining apparatus is provided. The apparatus includes a barrel, a cover unit provided on a side surface of the barrel, a first driver provided in the cover unit, for rotating the barrel in a first direction (around an X axis) to keep the barrel in horizontal posture, a second driver provided in the cover unit, for rotating the cover unit in a second direction (around a Y axis) to keep the barrel in the horizontal posture, and a controller for controlling rotation of the first and second drivers.

11 Claims, 11 Drawing Sheets

(51) Int. Cl.
*G03B 15/00* (2006.01)
*G03B 17/56* (2006.01)
*G05D 1/00* (2006.01)
*H04N 5/225* (2006.01)

HORIZONTAL-POSTURE MAINTAINING APPARATUS

CROSS-REFERENCE TO RELATED APPLICATION(S)

This application claims the benefit under 35 U.S.C. § 119(a) of a Korean patent application filed on May 10, 2016 in the Korean Intellectual Property Office and assigned Serial number 10-2016-0057081, the entire disclosure of which is hereby incorporated by reference.

TECHNICAL FIELD

The present disclosure relates to a horizontal-posture maintaining apparatus for enabling a camera to shoot in horizontal posture.

BACKGROUND

In general, when a user takes a photo or a video, the user needs to capture an image, while keeping a camera leveled without tremor. As anyone can easily shoot with a compact video camera, a camcorder, or a portable phone while moving outdoors, requirements and demands for improving portable equipment that stabilizes a video camera, a camcorder, or a portable phone without tremor are on the increase. For example, to achieve flexible, high-quality results for movies, video, or photos, efforts have been made to get in-focus shots during movement.

In this context, horizontal-posture maintaining apparatuses for enabling a camera to shoot in horizontal posture have been developed, such as a gimbal or a steadicam.

In such a horizontal-posture maintaining apparatus, a driver is provided for each axis and operates to maintain leveling. A rotational axis is involved stepwise in the next axis rotation. That is, if rotation around the Z axis occurs, an X-axis driver, a Y-axis driver, and support structures also rotate, and for the X axis, only an X-axis related support structure rotates. The horizontal-posture maintaining apparatus is designed in such a manner that a separate camera is mounted to the apparatus, particularly fixedly mounted to an end of a final rotational axis, the X axis.

However, since the drivers are near to the rotational axes and thus the X-axis driver and the Y-axis driver are positioned ahead of and behind the camera, respectively, the horizontal-posture maintaining apparatus is long and bulky on the whole. In other words, since the product should provide the X-axis driver and the Y-axis driver ahead of and behind the camera, and structures for supporting rotations of the X-axis driver and the Y-axis driver as well as a space for mounting a camera module, the resulting increase in the size of the product makes it impossible to apply the product to an ultra-small camera module, to miniaturize the product, and to render the product slim.

Moreover, the X-axis driver, the Y-axis driver, and the structures of the X-axis driver and the Y-axis driver are arranged extended along the forward and backward directions of the camera in the horizontal-posture maintaining apparatus. As a result, the long structures lead to large rotations and thus tremor of the structures cause vibrations.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a horizontal-posture maintaining apparatus having first and second drivers on a side surface of a camera barrel with a camera module built therein, for maintaining the camera module in horizontal posture, so that a product size may be reduced and thus the product may be made small and slim, due to providing of all drivers on the side surface of the camera module instead of a mechanism of the related art in which the drivers are provided ahead of and on a side surface of the camera module, and vibrations from the drivers may be reduced by minimizing a rotational movement during rotation of the camera module.

In accordance with an aspect of the present disclosure, a horizontal-posture maintaining apparatus is provided. The horizontal-posture maintaining apparatus includes a barrel, a cover provided on a side surface of the barrel, a first driver provided in the cover and configured to rotate the barrel in a first direction (around an X axis) so as to keep the barrel in a horizontal posture, a second driver provided in the cover and configured to rotate the cover in a second direction (around a Y axis) so as to keep the barrel in the horizontal posture, and at least one processor configured to control the rotation of the first and second drivers.

In accordance with another aspect of the present disclosure, a horizontal-posture maintaining apparatus having a camera is provided. The horizontal-posture maintaining apparatus includes a camera barrel having the camera built therein, a cover provided on a side surface of the camera barrel, a first driver provided in the cover and configured to rotate the camera barrel in a first direction (around an X axis) so as to keep the camera module in a horizontal posture, a second driver provided in the cover and configured to rotate the cover in a second direction (around a Y axis) so as to keep the camera module in the horizontal posture, and at least one processor configured to control the rotation of the first and second drivers.

In accordance with another aspect of the present disclosure, a horizontal-posture maintaining method in a horizontal-posture maintaining apparatus including a camera is provided. The method includes sensing leveling or non-leveling and movement of a camera built in the horizontal-posture maintaining apparatus through a plurality of sensors provided in the camera or a cover; controlling a power supply to first and second drivers by receiving a control signal for enabling the camera to capture an image in horizontal posture, in real time according to a sensing signal by at least one processor; and rotating the camera barrel and the cover in first and second directions (around X and Y axes, respectively) by rotating according to power supply controlled by the at least one processor, and correcting a posture of the camera to keep the camera in the horizontal posture with the rotation of the camera barrel and the cover, by first and second driving motors of the first and second drivers.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
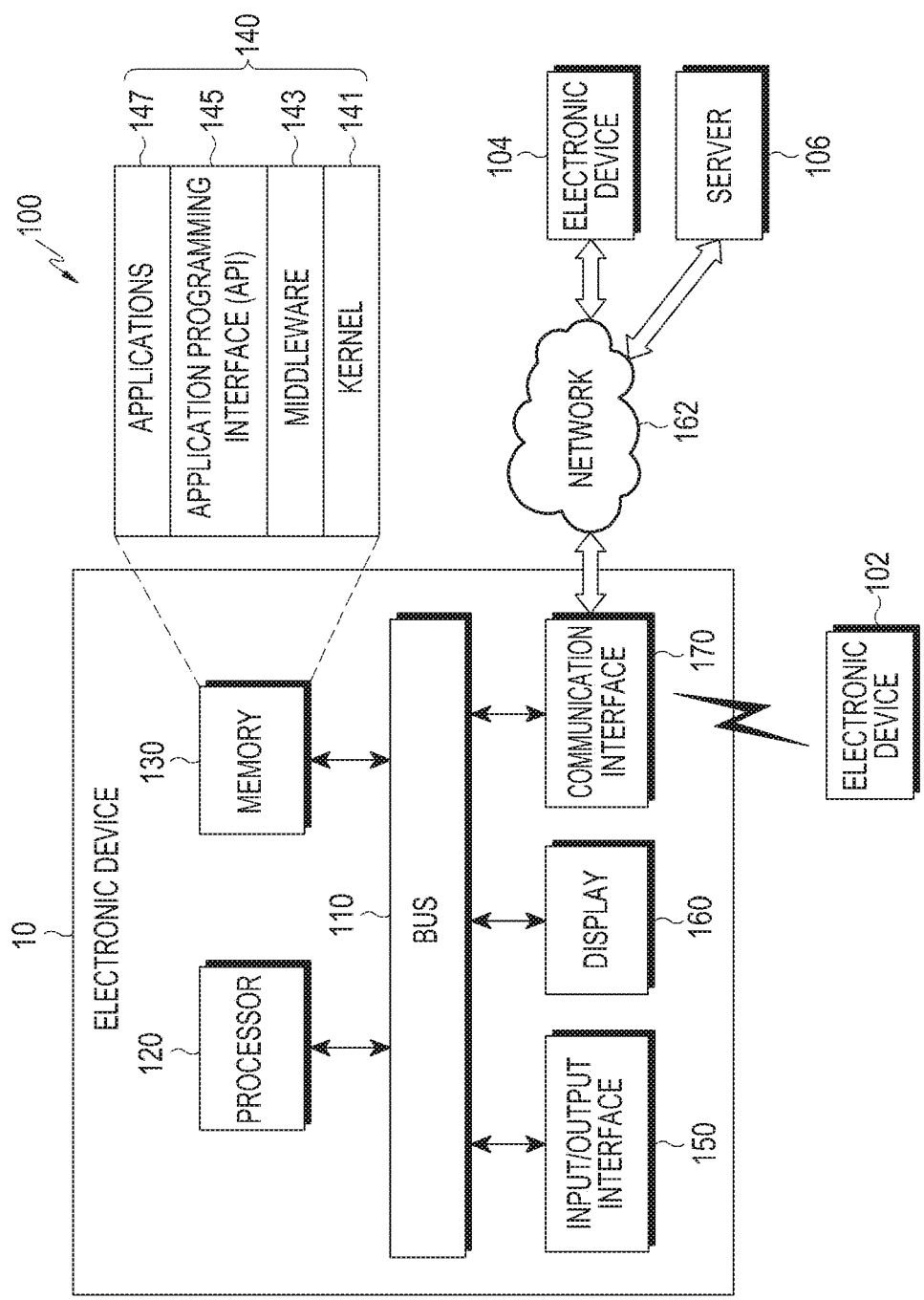
FIG. 1 is a block diagram illustrating a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications, of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the term 'have', 'may have', 'include', or 'may include' signifies the presence of a specific feature (for example, number, function, operation, or component such as part), not excluding the presence of one or more other features.

In the present disclosure, the term 'A or B', 'at least one of A or/and B', or 'one or more of A or/and B' may cover all possible combinations of enumerated items. For example, 'A or B', 'at least one of A and B', or 'at least one of A or B' may represent all of the cases of (1) inclusion of at least one A, (2) inclusion of at least one B, and (3) inclusion of at least one A and at least one B.

The term as used in the present disclosure, 'first' or 'second' may modify the names of various components irrespective of sequence and/or importance, not limiting the components. These expressions are used to distinguish one component from another component. For example, a first user equipment (UE) and a second UE may indicate different UEs irrespective of sequence or importance. For example, a first component may be referred to as a second component and vice versa without departing the scope of the present disclosure.

When it is said that a component (for example, a first component) is 'operatively or communicatively coupled with/to' or 'connected to' another component (for example, a second component), it should be understood that the one component is connected to the other component directly or through any other component (for example, a third component). On the other hand, when it is said that a component (for example, a first component) is 'directly connected to' or 'directly coupled to' another component (for example, a second component), it may be understood that there is no other component (for example, a third component) between the components.

The term 'configured to' as used herein may be replaced with, for example, the term 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may mean that a device may mean 'capable of' with another device or part. For example, 'a processor configured to execute A, B, and C' may mean a dedicated processor (for example, an embedded processor) for performing the corresponding operations or a generic-purpose processor (for example, a central processing unit (CPU) or an application processor (AP)) for performing the operations.

The terms as used in the present disclosure are provided to describe merely specific embodiments, not intended to limit the scope of other embodiments. It is to be understood that singular forms include plural referents unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

According to various embodiments of the present disclosure, an electronic device may be at least one of, for example, a smart phone, a tablet personal computer (PC), a mobile phone, a video phone, an e-Book reader, a desktop PC, a laptop PC, a netbook computer, a workstation, a server, a personal digital assistant (PDA), a portable multimedia player (PMP), an MP3 player, a mobile medical equipment, a camera, or an wearable device. According to various embodiments, the wearable device may be at least one of an accessory type (for example, a watch, a ring, a bracelet, an ankle bracelet, a necklace, glasses, contact lenses, or a head-mounted device (HMD)), a fabric or clothes type (for example, electronic clothes), an attached type (for example, a skin pad or a tattoo), or an implantable type (for example, an implantable circuit).

According to some embodiments, an electronic device may be a home appliance. For example, the home appliance may be at least one of a television (TV), a digital versatile disc (DVD) player, an audio player, a refrigerator, an air conditioner, a vacuum cleaner, an oven, a microwave oven, a washer, an air purifier, a set-top box, a home automation control panel, a security control panel, a TV box (for example, Samsung HomeSync™, Apple TV™, Google TV™, or the like), a game console (for example, Xbox™, PlayStation™, or the like), an electronic dictionary, an electronic key, a camcorder, or an electronic picture frame.

According to various embodiments, an electronic device may be at least one of a medical device (for example, a portable medical meter such as a blood glucose meter, a heart rate meter, a blood pressure meter, or a body temperature meter, a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (for example, a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, or an Internet of things (IoT) device (for example, a lighting bulb, various sensors, an electricity or gas meter, a sprinkler, a fire alarm, a thermostat, a street lamp, a toaster, sports goods, a hot water tank, a heater, or a boiler).

According to various embodiments, an electronic device may be at least one of furniture, part of a building/structure, an electronic board, an electronic signature receiving device, a projector, and various measuring devices (for example, water, electricity, gas or electro-magnetic wave measuring devices). According to various embodiments, an electronic device may be one or a combination of two or more of the foregoing devices. According to some embodiments, an electronic device may be a flexible electronic device. In addition, it will be apparent to one having ordinary skill in the art that an electronic device according to an embodiment of the present disclosure is not limited to the foregoing devices and covers a new electronic device produced along with technology development.

FIG. 1 is a block diagram illustrating a network environment including an electronic device according to an embodiment of the present disclosure.

Referring to FIG. 1, an electronic device 10 in a network environment 100 according to various embodiments is described. The electronic device 10 may include a bus 110, a processor 120, a memory 130, an input/output (I/O) interface 150, a display 160, and a communication interface 170. In some embodiments, at least one of the components may be omitted in the electronic device 10 or a component may be added to the electronic device 10.

The bus 110 may include a circuit that interconnects, for example, the foregoing components 120, 130, 150, 160, and 170 and allows communication (for example, control messages and/or data) between the foregoing components.

The processor 120 may include one or more of a CPU, an AP, or a communication processor (CP). The processor 120 may, for example, execute computation or data processing related to control and/or communication of at least one other component of the electronic device 10.

The memory 130 may include a volatile memory and/or a non-volatile memory. The memory 130 may, for example, store instructions or data related to at least one other component of the electronic device 10. According to an embodiment, the memory 130 may store software and/or programs 140. The programs 140 may include, for example, a kernel 141, middleware 143, an application programming interface (API) 145, and/or application programs (or applications) 147. At least a part of the kernel 141, the middleware 143, and the API 145 may be called an operating system (OS).

The kernel 141 may control or manage system resources (for example, the bus 110, the processor 120, or the memory 130) that are used in executing operations or functions implemented in other programs (for example, the middleware 143, the API 145, or the application programs 147). Also, the kernel 141 may provide an interface for allowing the middleware 143, the API 145, or the application programs 147 to access individual components of the electronic device 10 and control or manage system resources.

The middleware 143 may serve as a medium through which the kernel 141 may communicate with, for example, the API 145 or the application programs 147 to transmit and receive data.

Also, the middleware 143 may process one or more task requests received from the application programs 147 according to their priority levels. For example, the middleware 143 may assign priority levels for using system resources (the bus 110, the processor 120, or the memory 130) of the electronic device 10 to at least one of the application programs 147. For example, the middleware 143 may perform scheduling or load balancing for the one or more task requests by processing the one or more task requests according to the priority levels assigned to the at least one application program 147.

The API 145 is, for example, an interface for the applications 147 to control functions that the kernel 141 or the middleware 143 provides. For example, the API 145 may include at least one interface or function (for example, a command) for file control, window control, video processing, or text control.

The I/O interface 150 may, for example, act as an interface that provides a command or data received from a user or an external device to the other component(s) of the electronic device 10. Further, the I/O interface 150 may output a command or data received from the other component(s) of the electronic device 10 to the user or the external device.

The display 160 may include, for example, a liquid crystal display (LCD), a light emitting diode (LED) display, an organic LED (OLED) display, a microelectromechanical systems (MEMS) display, or an electronic paper display. The display 160 may display, for example, various types of content (for example, text, an image, a video, an icon, or a symbol) to the user. The display 160 may include a touch screen and receive, for example, a touch input, a gesture input, a proximity input, or a hovering input through an electronic pen or a user's body part.

The communication interface 170 may establish communication, for example, between the electronic device 10 and an external device (for example, a first external electronic device 102, a second external electronic device 104, or a server 106). For example, the communication interface 170 may be connected to a network 162 by wireless communication or wired communication, and communicate with the external device (for example, the second external electronic device 104 or the server 106) over the network 162.

The wireless communication may be conducted by cellular communication in conformance to, for example, at least one of long term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM). According to an embodiment, the wireless communication may be conducted by, for example, at least one of wireless fidelity (WiFi), Bluetooth, Bluetooth low energy (BLE), Zigbee, near field communication (NFC), magnetic secure transmission (MST), radio frequency (RF), or body area network (BAN). According to an embodiment, the wireless communication may include GNSS. GNSS may include, for example, at least one of global positioning system (GPS), global navigation satellite system (Glonass), Beidou navigation satellite system (hereinafter, referred to as 'Beidou'), or Galileo, the European global satellite-based navigation system. In the present disclosure, the terms 'GPS' and 'GNSS' are interchangeably used with each other. The wired communication may be conducted in conformance to, for example, at least one of universal serial bus (USB), high definition multimedia interface (HDMI), recommended standard 232 (RS-232), or plain old telephone service (POTS). The network 162 may be a communication network, for example, at least one of a computer network (for example, local area network (LAN) or wide area network (WAN)), the Internet, or a telephone network.

Each of the first and second external electronic devices 102 and 104 may be of the same type as or a different type from the electronic device 10. According to an embodiment, the server 106 may include a group of one or more servers. According to various embodiments, all or a part of operations performed in the electronic device 10 may be performed in one or more other electronic devices (for example, the electronic devices 102 and 104) or the server 106. According to an embodiment, if the electronic device 10 is to perform a function or a service automatically or upon request, the electronic device 10 may request at least a part of functions related to the function or the service to another device (for example, the electronic device 102 or 104 or the server 106), instead of performing the function or the service autonomously, or additionally. The other electronic device (for example, the electronic device 102 or 104 or the server 106) may execute the requested function or an additional function and provide a result of the function execution to the electronic device 10. The electronic device 10 may provide the requested function or service based on the received result or by additionally processing the received result. For this purpose, for example, cloud computing, distributed computing, or client-server computing may be used.

The electronic device 10 as described below may be any of the afore-described wearable device, a laptop computer, a smartphone, a tablet PC, Galaxy Tab, IPad, a camera module, a charger, a wireless charger, and a horizontal-posture maintaining apparatus.

With reference to the attached drawings, a horizontal-posture maintaining apparatus including a camera module according to various embodiments will be described below. In the present disclosure, the term 'user' may mean a person or device (for example, a gimbal device or an unmanned/uninhabited aerial vehicle (UAV)) that uses a horizontal-posture maintaining apparatus for a camera module.

The horizontal-posture maintaining apparatus (200 in FIG. 2) according to various embodiments of the present disclosure is described as, but not limited to, a horizontal-posture maintaining apparatus for a camera module. For example, the horizontal-posture maintaining apparatus may be applied to various electronic devices which should be kept leveled. For example, instead of a camera barrel, a laser barrel or an object requiring leveling may be applied as a barrel of the horizontal-posture maintaining apparatus.

A camera is designed in the shape of a sphere or semi-sphere on the whole, and the overall exterior of the camera may be configured to include a camera housing (not shown) and a base (not shown). The housing may be formed of transparent glass in order to protect a lens assembly (not shown) by accommodating at least part of the lens assembly inside it and capture an image through the lens assembly. The base may form the outer surface of the housing of the camera and have a space in it, for accommodating part of the lens assembly, an image sensor (for example, a front sensor or a rear sensor), a printed circuit board (PCB), an image signal processor (ISP), or a flash (for example, a LED or a xenon lamp). The base functions to fix and protect parts mounted in it. Various buttons for checking wired or wireless connection or engagement with external parts may be disposed on the outer surface of the base.

According to various embodiments, the camera module may include at least one wide lens mounted in the base. For example, the wide lens may include various lenses such as a fish-eye lens and a super wide lens. In another example, the fish-eye lens is a super wide lens with an angle of view of 180 or more degrees, which is capable of capturing a whole image with a field of view of 180 degrees in one circle. The lens assembly may further include an optical member such as a concave lens or a convex lens disposed in a light path in order to control a focal length, in addition to an optical lens.

According to various embodiments, the image sensor of the camera module is disposed inside the base. The image sensor senses information about an object from the lens assembly and converts the sensed information to an electrical image signal. The image sensor may be, for example, a charge coupled device (CCD) image sensor or a complementary metal oxide semiconductor (CMOS) image sensor. However, the image sensor is not limited to these sensors, and as far as it executes a similar function, any other sensor device is available as the image sensor.

According to various embodiments, the image sensor may have one surface facing the lens assembly and the other surface facing a PCB.

According to various embodiments, the PCB is disposed in the base, and various electronic devices may be arranged in the form of an integrated circuit (IC) on the PCB. The PCB may include various devices such as an image processing device for storing and processing an image captured through the lens assembly. For example, wired communication terminals for connection to a communication unit of the PCB and connection between an external device and a wired connector may be arranged on one surface of the base.

The structure of a horizontal-posture maintaining apparatus 200 including a camera module 211 according to various embodiments of the present disclosure will be described below in detail.

Figure 2:
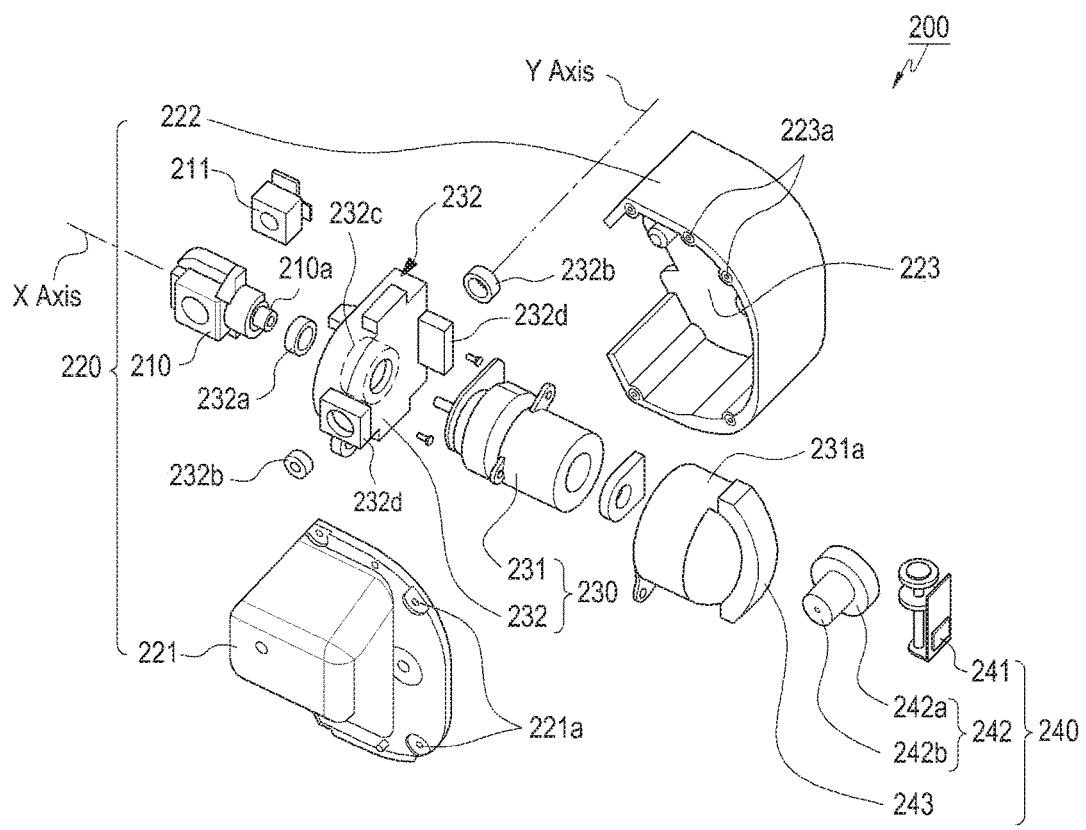
FIG. 2 is an exploded perspective view illustrating the structure of a horizontal-posture maintaining apparatus according to an embodiment of the present disclosure.

FIG. 2 is an exploded perspective view illustrating the structure of the horizontal-posture maintaining apparatus 200 including the camera module 211 according to an embodiment of the present disclosure.

Figure 3:
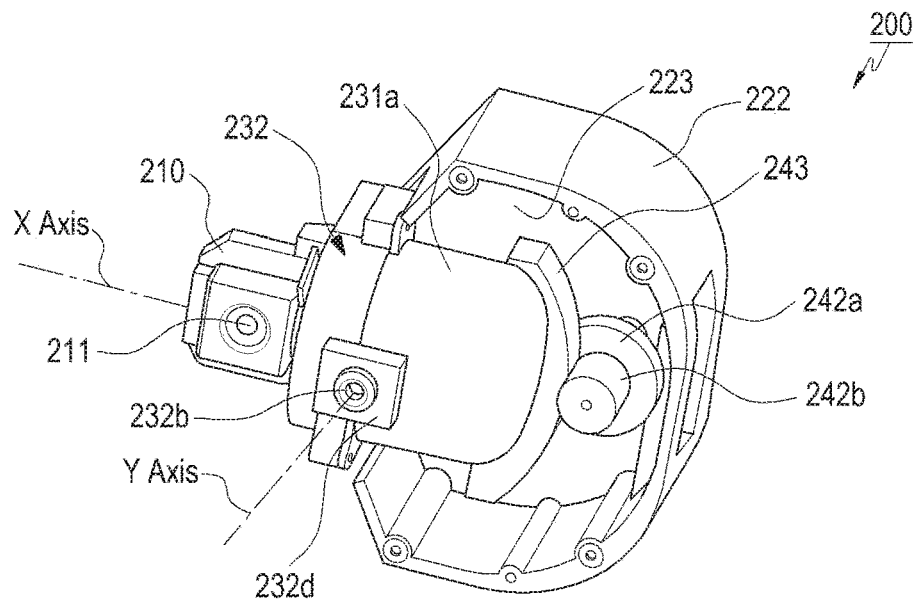
FIG. 3 is a perspective view illustrating assembly between the first driver and the second driver in the horizontal-posture maintaining apparatus including the camera module according to an embodiment of the present disclosure.

FIG. 3 is a perspective view illustrating assembly between a first driver 230 and a second driver 240 in the horizontal-posture maintaining apparatus 200 including the camera module 211 according to an embodiment of the present disclosure.

Figure 4:
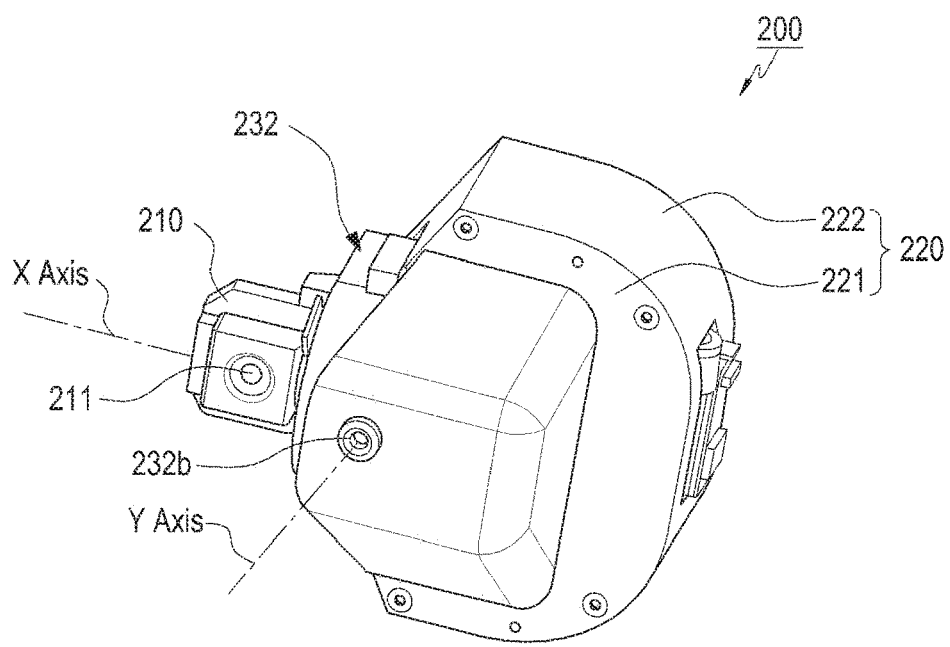
FIG. 4 is a perspective view illustrating assembly of the horizontal-posture maintaining apparatus including the camera module according to an embodiment of the present disclosure.

FIG. 4 is a perspective view illustrating assembly of the horizontal-posture maintaining apparatus 200 including the camera module 211 according to an embodiment of the present disclosure.

Referring to FIGS. 2, 3, and 4, the horizontal-posture maintaining apparatus 200 may include a camera barrel 210 with the camera module 211 built in it, a cover unit 220, the first driver 230, the second driver 240, and a controller 250. For example, the camera barrel 210 may be provided on one side surface of the later-described first and second drivers 230 and 240 in order to keep the camera module 211 in horizontal posture.

The cover unit 220 may include the first and second drivers 230 and 240, and may be disposed on a side surface of the camera module 210 in order to rotate the camera barrel 210 in first and second directions (around the X and Y axes).

The first driver 230 may be provided in the cover unit 220, for rotating the camera barrel 210 in the first direction (around the X axis) to keep the camera module 211 in the horizontal posture.

The second driver 240 may be provided in the cover unit 220, for rotating the camera barrel 210 in the second direction (around the Y axis) to keep the camera module 211 in the horizontal posture.

The controller 250 may control rotation of the first and second drivers 230 and 240.

The cover unit 220 may include a front cover 221 and a rear cover 222.

The front cover 221 may be provided with screw engagement portions 221a to be engaged with a plurality of engagement portions 223a provided in the rear cover 222. For example, the front cover 221 may be brought into contact with the rear cover 222 face to face, with the screw engagement portions 221a of the front cover 221 aligned with the engagement portions 223a of the second cover 222, and then screws may be engaged with the screw engagement portions 221a and the engagement portions 223a. When the front cover 221 is engaged with the rear cover 222, an accommodating space 223 may be formed inside the cover unit 220, for accommodating the first and second drivers 230 and 240.

The first driver 230 according to various embodiments of the present disclosure will be described below in greater detail.

Figure 5:
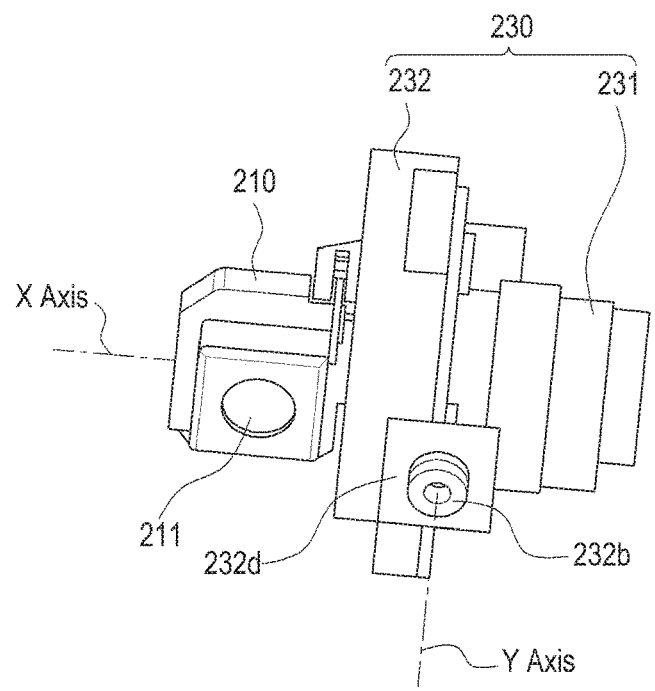
FIG. 5 is a perspective view illustrating assembly between a camera barrel and a first driver in a horizontal-posture maintaining apparatus including a camera module according to an embodiment of the present disclosure.

FIG. 5 is a perspective view illustrating assembly between the camera barrel 210 and the first driver 230 in the horizontal-posture maintaining apparatus 200 including the camera module 211 according to an embodiment of the present disclosure.

Figure 6:
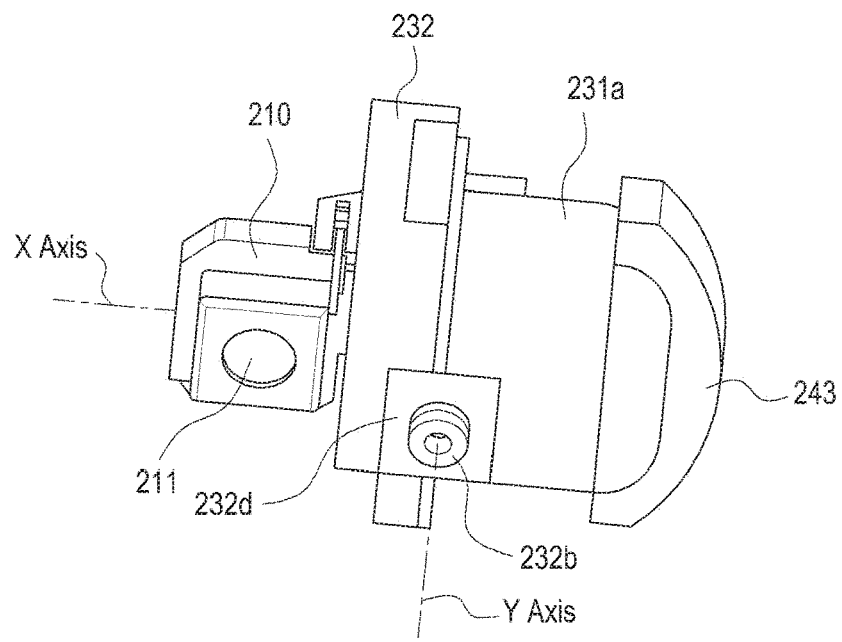
FIG. 6 is a perspective view illustrating assembly between a support member of the first driver and a guide gear unit of a second driver in the horizontal-posture maintaining apparatus including the camera module according to an embodiment of the present disclosure.

FIG. 6 is a perspective view illustrating assembly between a support member 232 of the first driver 230 and a guide gear unit 243 of the second driver 240 in the horizontal-posture maintaining apparatus 200 including the camera module 211 according to an embodiment of the present disclosure.

Figure 7:
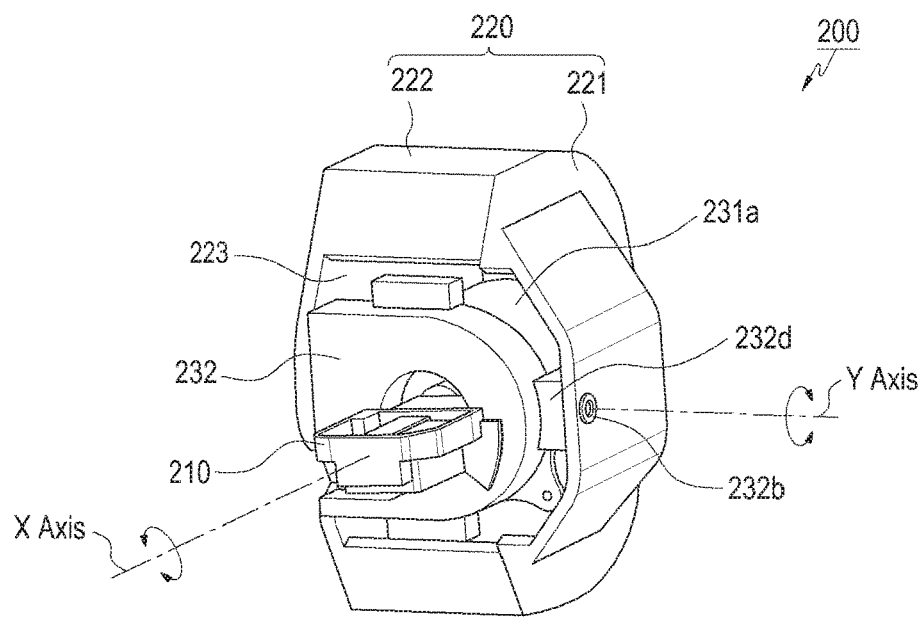
FIG. 7 is a perspective view illustrating rotation of the horizontal-posture maintaining apparatus including the camera module in a first direction according to an embodiment of the present disclosure.

FIG. 7 is a perspective view illustrating rotation of the horizontal-posture maintaining apparatus 200 including the camera module 211 in the first direction (around the X axis) according to an embodiment of the present disclosure.

Figure 8:
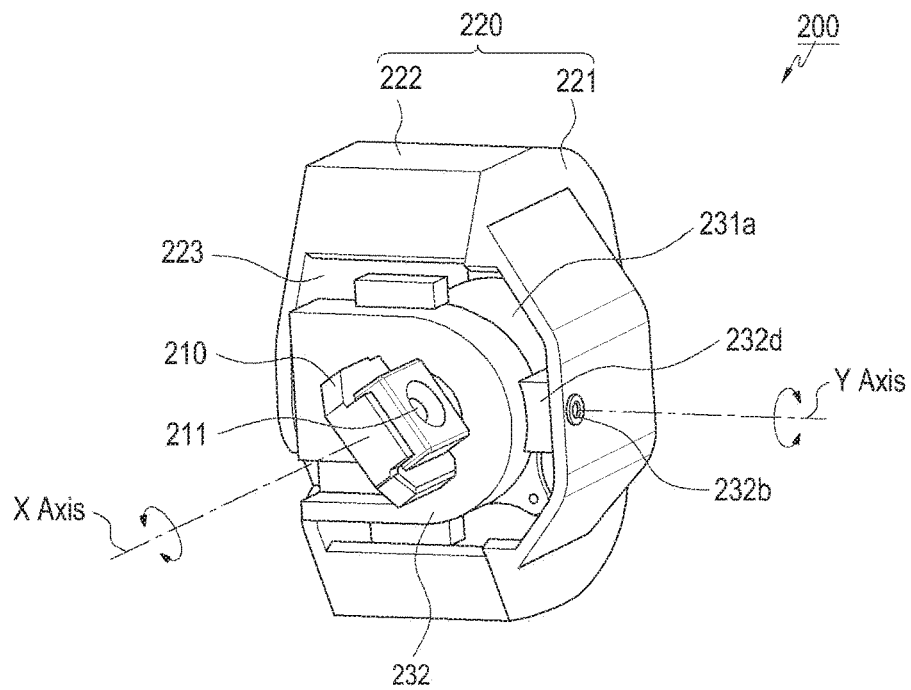
FIG. 8 is another perspective view illustrating the rotation of the horizontal-posture maintaining apparatus including the camera module in the first direction according to an embodiment of the present disclosure.

FIG. 8 is another perspective view illustrating the rotation of the horizontal-posture maintaining apparatus 200 including the camera module 211 in the first direction (around the X axis) according to an embodiment of the present disclosure.

Referring to FIGS. 5 to 8, the first driver 230 may include a first driving motor 231 and the support member 232. The first driving motor 231 may be disposed on a side surface of the camera barrel 210, rotatably connected to the camera barrel 210, so that the first driving motor 231 may rotate the camera barrel 210 in the first direction (around the X axis) in response to power supply of the controller 250. The support member 232 may be provided in the cover unit 220, for supporting rotation of the camera barrel 210.

The support member 232 may be engaged with a rotator (210a in FIG. 2) formed on a side surface of the camera barrel 210, and may include a first bearing container 232c for accommodating a first bearing 232a to support the first-direction (X-axis) rotation of the first driving motor 231. The support member 232 may include a plurality of second bearing containers 232d for accommodating a plurality of second bearings 232b to support rotation of the second driving motor 241 in the second direction (around the Y axis).

For example, the first bearing container 232c may be provided in perpendicular to the first direction (the X axis) of the support member 232, and the first bearing 232a may be accommodated in the first bearing container 232c, in engagement with the rotator 210a of the camera barrel 210.

The second bearing containers 232d may be provided in perpendicular to the second direction (the Y axis) of the support member 232, and accommodate the second bearings 232b, respectively.

The first driving motor 231 may be one of a brushless motor and a stepping motor. In an embodiment of the present disclosure, the first driving motor 231 will be described in the context of a brushless motor.

A rotational shaft of the first driving motor 231 may be rotated in response to power supply of the controller 250, and the camera barrel 210 may be rotated in the first direction (around the X axis) along with the rotation of the first driving motor 231. Herein, the first driving motor 231 may make the rotation of the camera barrel 210 smooth, simultaneously with supporting the rotation of the camera barrel 210, by means of the first bearing 232*a*.

As illustrated in FIGS. 7 and 8, the controller 250 may sense movement of the cover unit 220 through at least one sensor unit (not shown), receive a control signal for keeping the camera module 211 in the horizontal posture in real time according to a sensing signal received from the at least one sensor unit, and control rotation of the first driving motor 231 by controlling supply of power to the first driver 230 based on the control signal. The first driving motor 231 may correct the posture of the camera module 211 to the horizontal posture by rotating the camera module 211 simultaneously with rotation of the camera barrel 210 in the first direction (around the X axis) in response to power supply of the controller 250.

The second driver 240 according to various embodiments of the present disclosure will be described below in greater detail.

Figure 9:
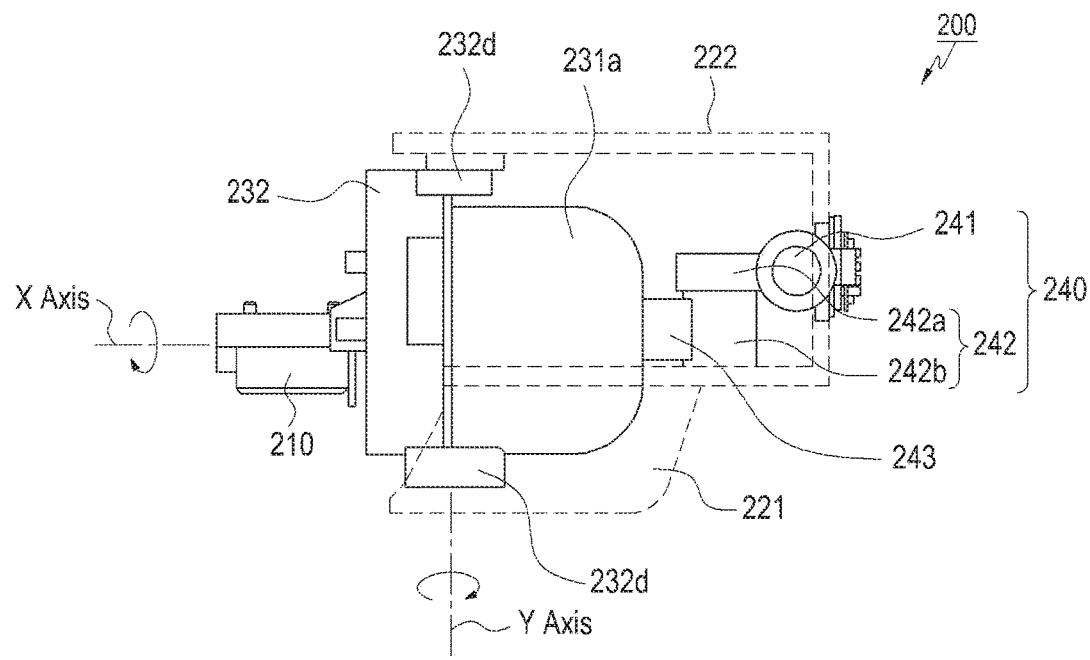
FIG. 9 is a plan view illustrating the horizontal-posture maintaining apparatus including the camera module prior to rotation in a second direction according to an embodiment of the present disclosure.

FIG. 9 is a plan view illustrating the horizontal-posture maintaining apparatus 200 including the camera module 211 prior to rotation in the second direction according to an embodiment of the present disclosure.

Figure 10:
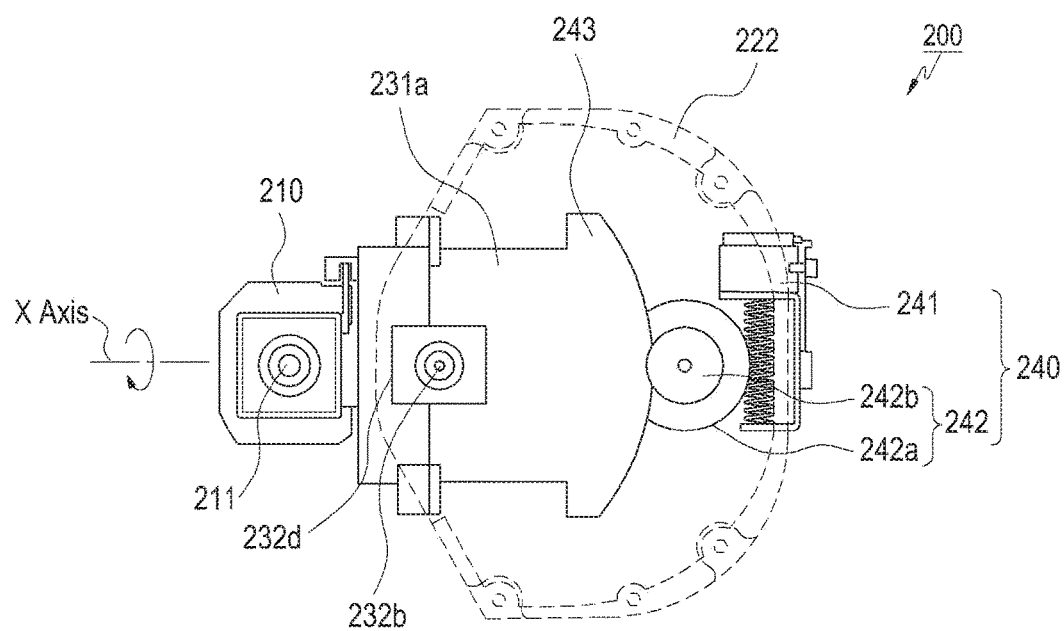
FIG. 10 is a front view illustrating the horizontal-posture maintaining apparatus including the camera module prior to the rotation in the second direction according to an embodiment of the present disclosure.

FIG. 10 is a front view illustrating the horizontal-posture maintaining apparatus 200 including the camera module 211 prior to the rotation in the second direction according to an embodiment of the present disclosure.

Figure 11:
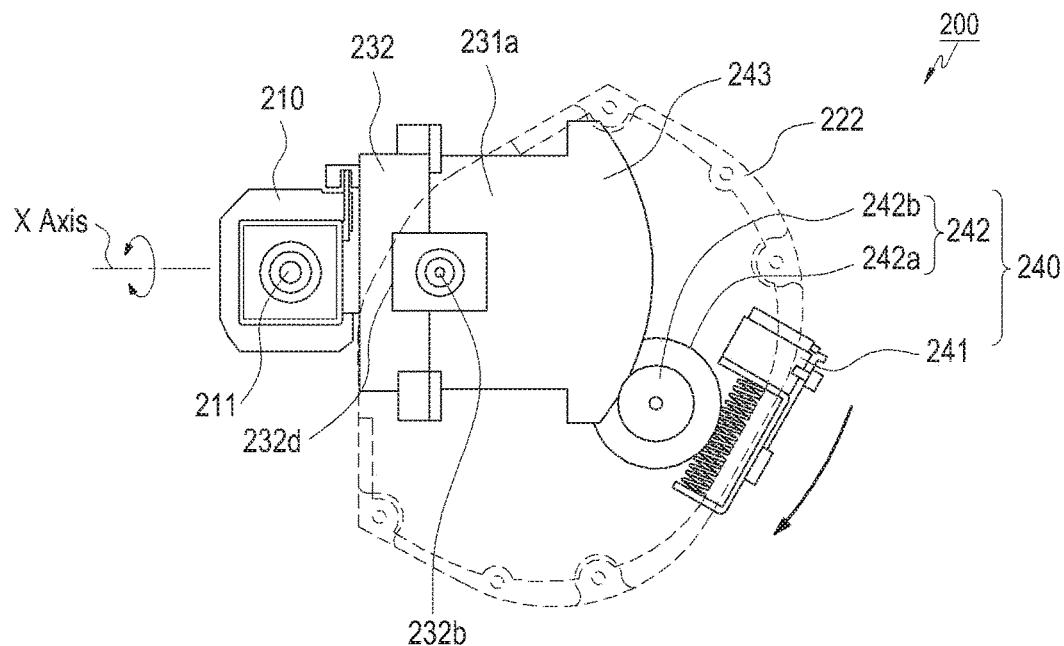
FIG. 11 is a plan view illustrating the rotation of the horizontal-posture maintaining apparatus including the camera module in the second direction according to an embodiment of the present disclosure.

FIG. 11 is a plan view illustrating the rotation of the horizontal-posture maintaining apparatus 200 including the camera module 211 in the second direction according to an embodiment of the present disclosure.

Figure 12:
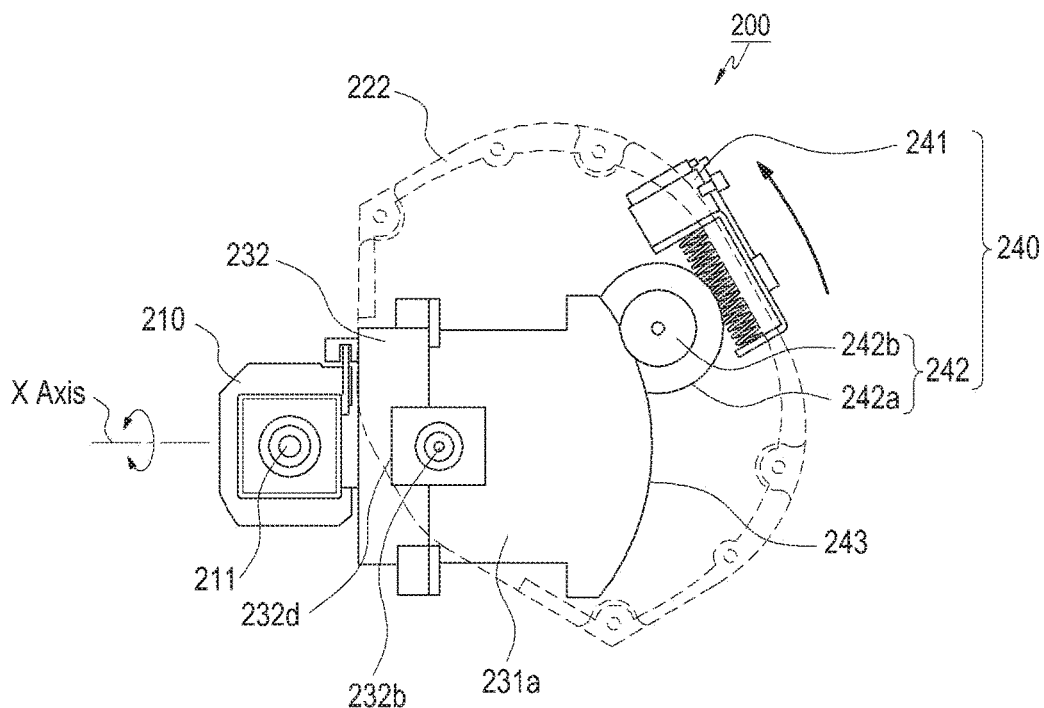
FIG. 12 is another plan view illustrating the rotation of the horizontal-posture maintaining apparatus including the camera module in the second direction according to an embodiment of the present disclosure.

FIG. 12 is another plan view illustrating the rotation of the horizontal-posture maintaining apparatus 200 including the camera module 211 in the second direction according to an embodiment of the present disclosure.

Referring to FIGS. 9 to 12, the second driver 240 may include the second driving motor 241, a gear unit 242, and the guide gear unit 243. The second driving motor 241 may be provided in the cover unit 220, for rotating in response to power supplied by the controller 250. The gear unit 242 may be engaged rotatably in the cover unit 220, so that the gear unit 242 may be rotatably engaged with the second driving motor 241. The guide gear unit 243 may be rotatably engaged with the gear unit 242, so as to receive a rotational force from the gear unit 242 that rotates along with rotation of the second driving motor 241 and thus rotate the cover unit 220 in the second direction (around the Y axis).

The gear unit 242 may include a first gear 242*a* and a second gear 242*b*.

The first gear 242*a* may be provided in the gear unit 242, for engaging with a gear of the second driving motor 241.

The second gear 242*b* may be provided in the vicinity of the first gear 242*a*, for engaging with the guide gear unit 243.

For example, the gear unit 242 is rotatably engaged with a gear engagement portion (not shown) formed in the cover unit 220. In this state, the first gear 242*a* of the gear unit 242 may be engaged with the gear of the second driving motor 241, and the second gear 242*b* of the gear unit 242 may be engaged with the guide gear unit 243.

The guide gear unit 243 may be provided on the exterior of a motor case 231*a* engaged with the first driving motor 231. For example, the motor case 231*a* may be curved, and the guide gear unit 243 may also be curved along with the curved shape of the motor case 231*a*.

The second driving motor 241 may be one of a brushless motor and a stepping motor. In an embodiment of the present disclosure, the second driving motor 241 will be described in the context of a stepping motor.

As illustrated in FIGS. 11 and 12, the controller 250 may sense movement of the cover unit 220 through at least one sensor unit (not shown), receive a control signal for keeping the camera module 211 in the horizontal posture in real time according to a sensing signal received from the at least one sensor unit, and control supply of power to the second driver 240 based on the control signal. The second driving motor 241 may correct the posture of the camera module 211 to the horizontal posture by rotating the camera module 211 simultaneously with rotation of the camera barrel 210 in the second direction (around the Y axis) in response to power supply of the controller 250.

According to an embodiment, the controller 250 may include at least one sensor unit (not shown), receive a control signal for keeping the camera module 211 in the horizontal posture in real time according to a sensing signal received from the at least one sensor unit, and control rotation of the first and second driving motors 231 and 241 in the first and second directions (around the X and Y axes) by controlling supply of power to the first and second drivers 230 and 240 based on the control signal. Thus, rotation of the camera module 211 and rotation of the cover unit 220 may be corrected.

According to various embodiments, the sensor unit (not shown) may measure physical quantities or sense an operation state of each electronic device in the horizontal-posture maintaining apparatus, and convert the measured or sensed information into electric signals. The sensor unit may include at least one of, for example, a gesture sensor, a gyro sensor, an atmospheric pressure sensor, a magnetic sensor, an accelerometer sensor, a grip sensor, a proximity sensor, a color sensor (for example, a red, green, blue (RGB) sensor), a biometric sensor, a temperature/humidity sensor, an illumination sensor, or an ultra violet (UV) sensor. Additionally or alternatively, the sensor unit may include, for example, an electrical-nose (E-nose) sensor, an electromyogram (EMG) sensor, an electroencephalogram (EEG) sensor, an electrocardiogram (ECG) sensor, an infrared (IR) sensor, an iris sensor, and/or a finger print sensor. In another example, the sensor unit may further include a control circuit for controlling one or more sensors included therein.

A process of assembling the horizontal-posture maintaining apparatus including the camera module 211 according to various embodiments of the present disclosure will be described below.

As described before with reference to FIG. 1, the camera module 211 may be built in the camera barrel 210, and the rotator 210*a* formed on the side surface of the camera barrel 210 may be engaged rotatably with the first bearing container 232*c* formed on a first surface of the support member 232. Since the first bearing 232*a* is accommodated in the first bearing container 232*c*, the rotator 210*a* of the camera barrel 210 may be rotatably engaged with the first bearing 232*a*, simultaneously with engaging with the first bearing container 232*c*. The first driving motor 231 may be provided on a second surface of the support member 232 opposite to the first surface of the support member 232, and the rotational shaft of the first driving motor 231 may be engaged inside the rotator 210a of the camera barrel 210 through the first bearing container 232c of the support member 232. The first driving motor 231 may be fixedly screwed with the support member 232. The motor case 231a for protecting the first driving motor 231 may be engaged on the exterior of the first driving motor 231. The second gear 242b of the gear unit 242 may be engaged with the guide gear unit 243 formed on the exterior of the motor case 231a, and the first gear 242a of the gear unit 242 may be engaged with the gear of the second driving motor 241.

The plurality of second bearing containers 232d may be formed in the second direction (along the Y axis) of the support member 232, and may be engaged with rotational protrusions (not shown) formed on the interior of the cover unit 220. Therefore, the support member 232 may rotate the cover unit 220 in the second direction (around the Y axis).

In this manner, after the support member 232, and the first and second drivers 230 and 240 are sequentially assembled to a side surface of the camera barrel 210, the cover unit 220 may be engaged with the support member 232. The cover unit 220 may include the front cover 221 and the rear cover 222, the support member 232 and the first and second drivers 230 and 240 may be accommodated in the accommodating space 223 formed in the front cover 221, and the front cover 221 may be engaged with the rear cover 222. Simultaneously with engagement of the front cover 221 with the rear cover 222, the screw engagement portions 221a of the front cover 221 may be brought into contact with the engagement portions 223a of the rear cover 222, face to face, and the engagement portions 221a and 223a may be fixedly screwed with each other.

An operation of the thus-assembled horizontal-posture maintaining apparatus will be described below.

As described before with reference to FIGS. 7, 8, 11, and 12, when a user captures an image through the camera module 211, while moving, holding the horizontal-posture maintaining apparatus 200, the sensor unit (not shown) may first sense the movement of the user to keep the camera module 211 in the horizontal posture along with the movement of the user. The sensor unit may sense the first and second directions (the X and Y axes) according to the movement of the user, and apply sensing signals to the controller 250. The controller 250 may supply power needed for posture correction to the first and second driving motors 231 and 241 of the first and second drivers 230 and 240 based on the received sensing signals. For example, the controller 250 may control power supply to the first driving motor 231 of the first driver 230, so that the first driving motor 231 may rotate in the first direction (around the X axis), and the first driving motor 231 may correct rotation of the camera module 211 in the first direction (around the X axis) according to the power supply. Further, the controller 250 may control power supply to the second driving motor 241 of the second driver 240 so that the second driving motor may rotate in the second direction (around the Y axis), and the second driving motor 241 may correct rotation of the camera module 211 in the second direction (around the Y axis) according to the power supply.

The controller 250 may receive a control signal for keeping the camera module 211 in the horizontal posture, in real time based on the sensing signals received from the sensor unit, control power supply to the first driver 230 based on the control signal, and correct rotation of the camera module 211 by rotating the first driving motor 231 based on the controlled power supply. Further, the controller 250 may control power supply to the second driver 240 based on the control signal, and correct rotation of the camera module 211 by rotating the second driving motor 241 based on the controlled power supply.

Figure 13:
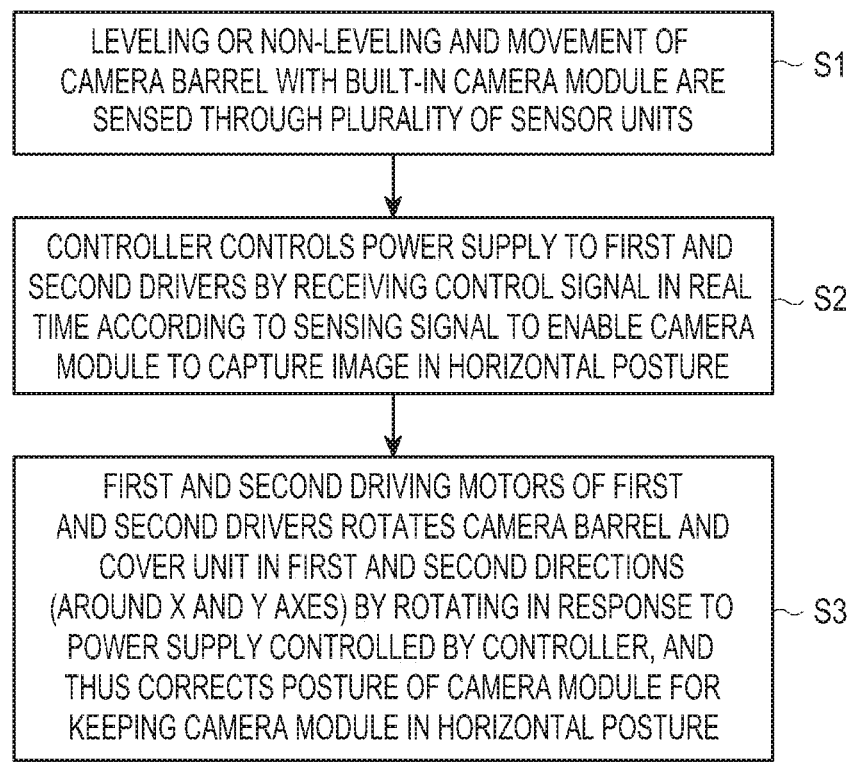
FIG. 13 is a flowchart illustrating a method for operating the horizontal-posture maintaining apparatus including the camera module according to an embodiment of the present disclosure.

A horizontal-posture maintaining method of the horizontal-posture maintaining apparatus 200 will be described in greater detail. FIG. 13 is a flowchart illustrating a method for operating the horizontal-posture maintaining apparatus 200 including the camera module 211 according to an embodiment of the present disclosure.

Leveling or non-leveling and movement of the camera barrel 210 with the camera module 211 built in it may be sensed using a plurality of sensor units provided in the camera module 211 or the cover unit 220 in operation S1.

The controller 250 may receive sensing signals from the sensor units, receive a control signal for enabling the camera module 211 to capture an image in the horizontal posture, in real time according to the sensing signals, and control supply of power to the first and second drivers 230 and 240 based on the control signal in operation S2.

The first and second driving motors 231 and 241 of the first and second drivers 230 and 240 may rotate in response to the controlled power supply, thus rotating the camera barrel 210 and the cover unit 220 in the first and second directions (around the X and Y axes), and may correct the posture of the camera module 211 to keep the camera module 211 in the horizontal posture in operation S3.

In this manner, the horizontal-posture maintaining apparatus 200 corrects an inclination of the camera module 211 in real time during capturing an image through the camera module 211. Therefore, a picture or a video may be acquired without tremor.

According to various embodiments of the present disclosure, a horizontal-posture maintaining apparatus may include a barrel, a cover unit provided on a side surface of the barrel, a first driver provided in the cover unit, for rotating the barrel in a first direction (around an X axis) to keep the barrel in horizontal posture, a second driver provided in the cover unit, for rotating the cover unit in a second direction (around a Y axis) to keep the barrel in the horizontal posture, and a controller for controlling rotation of the first and second drivers.

According to various embodiments of the present disclosure, the barrel may include a camera barrel with a built-in camera module.

According to various embodiments of the present disclosure, a horizontal-posture maintaining apparatus having a camera module may include a camera barrel having the camera module built therein, a cover unit provided on a side surface of the camera barrel, a first driver provided in the cover unit, for rotating the camera barrel in a first direction (around an X axis) to keep the camera module in horizontal posture, a second driver provided in the cover unit, for rotating the cover unit in a second direction (around a Y axis) to keep the camera module in the horizontal posture, and a controller for controlling rotation of the first and second drivers.

According to various embodiments of the present disclosure, the cover unit may include a front cover and a second cover, and an accommodating space for accommodating the first and second drivers may be provided in the front cover and the second cover.

According to various embodiments of the present disclosure, the first driver may include a first driving motor disposed on a side surface of the camera barrel, rotatably connected to the camera barrel, for rotating the camera barrel in the first direction (around the X axis) in response to power supply of the controller, and a support member provided in the cover unit, for supporting rotation of the camera barrel.

According to various embodiments of the present disclosure, the support member may include a first bearing container engaged with a rotator formed on a side surface of the camera barrel, and including a first bearing for supporting rotation of the first driving motor in the first direction (around the X axis), and a plurality of second bearing containers including a plurality of second bearings for supporting rotation of the second driving motor in the second direction (around the Y axis).

According to various embodiments of the present disclosure, the second driver may include a second driving motor provided in the cover unit, for rotating in response to power supply of the controller, a gear unit rotatably engaged in the cover unit and rotatably engaged with the second driving motor, and a guide gear unit rotatably engaged with the gear unit, for receiving a rotational force from the gear unit rotated along with rotation of the second driving motor, and guiding rotation of the cover unit in the second direction (around the Y axis) with the rotational force.

According to various embodiments of the present disclosure, the gear unit may include a first gear engaged with a gear of the second driving motor, and a second gear provided in the vicinity of the first gear, and engaged with the guide gear unit.

According to various embodiments of the present disclosure, the guide gear unit may be provided on the exterior of a motor case engaged with the first driving motor, and curved along with an exterior shape of the motor case.

According to various embodiments of the present disclosure, the horizontal-posture maintaining apparatus may further include at least one sensor unit for sensing movement of the cover unit, and the controller may receive a control signal for maintaining the camera module in the horizontal posture according to a sensing signal received from the at least one sensor, control rotation of the first and second driving motors by controlling power supply to the first and second drivers based on the control signal, and correct rotation of the camera module and rotation of the cover unit.

A gimbal device 300 equipped with the horizontal-posture maintaining apparatus 200 including the camera module 211 according to various embodiments of the present disclosure will be described below.

Figure 14:
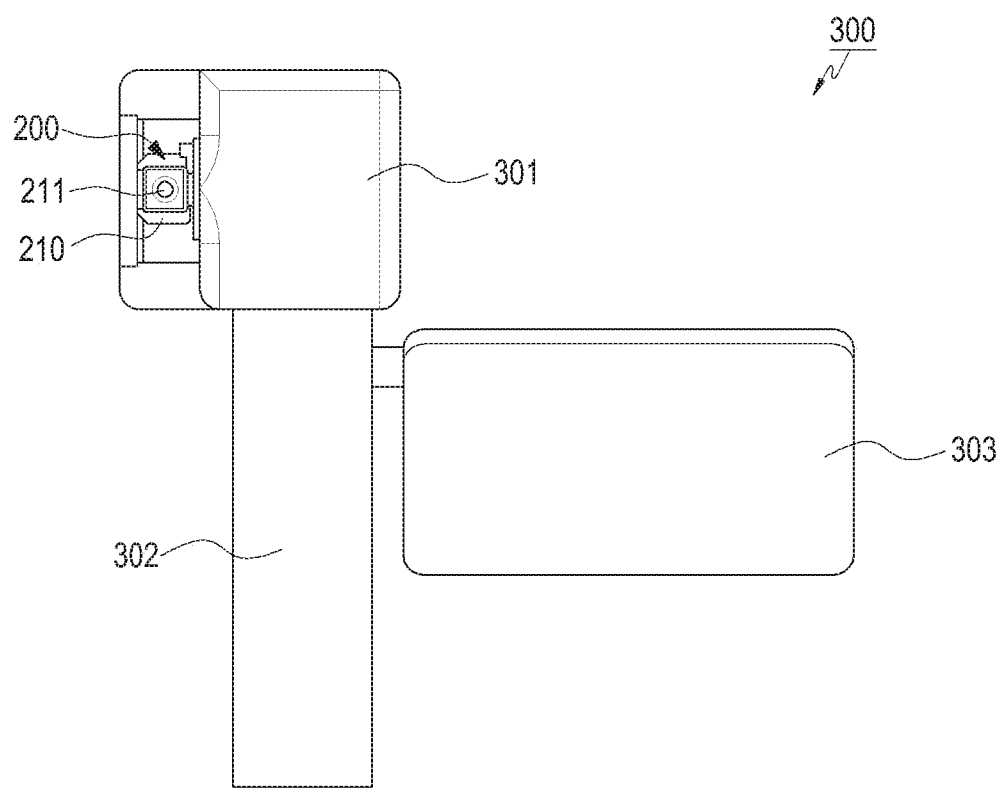
FIG. 14 is a front view illustrating a gimbal device equipped with the horizontal-posture maintaining apparatus including the camera module according to an embodiment of the present disclosure.

FIG. 14 is a front view illustrating the gimbal device 300 equipped with the horizontal-posture maintaining apparatus 200 including the camera module 211 according to an embodiment of the present disclosure.

Figure 15:
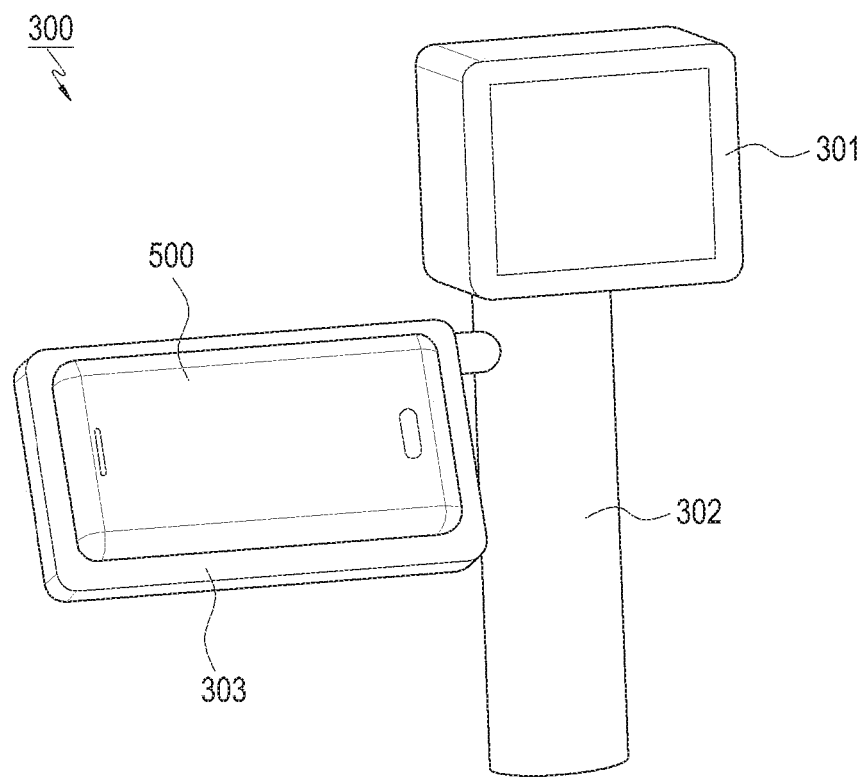
FIG. 15 is a rear view illustrating the gimbal device equipped with the horizontal-posture maintaining apparatus including the camera module according to an embodiment of the present disclosure.

FIG. 15 is a rear view illustrating the gimbal device 300 equipped with the horizontal-posture maintaining apparatus 200 including the camera module 211 according to an embodiment of the present disclosure.

Referring to FIGS. 14 and 15, the gimbal device 300 may be equipped with the horizontal-posture maintaining apparatus 200, and the camera barrel 210 may be included in the horizontal-posture maintaining apparatus 200. A user may capture an image through the camera module 211 in the camera barrel 210, while viewing the captured image on a viewfinder of an electronic device 500.

The gimbal device 300 is a device having a handle 302, which enables the user to capture vivid images at various angles, while moving, grabbing the handle 302.

For example, the gimbal device 300 may include a mounting unit 301, the handle 302, and a rotational attachment/detachment unit 303.

The horizontal-posture maintaining apparatus 200 may be mounted in the mounting unit 301, and the mounting unit 301 may have an opening through which the camera module 211 of the horizontal-posture maintaining apparatus 200 is exposed outward.

The handle 302 may be provided under the mounting unit 301 so that the user may capture an image through the camera module 211, holding the handle 302 while moving.

The rotational attachment/detachment unit 303 may be rotatably connected to a side surface of the handle 302, to allow attachment/detachment of the electronic device 500 with the viewfinder.

The rotational attachment/detachment unit 303 may be rotated by a hinge unit (not shown) provided on the side surface of the handle 302.

In this state, the user may capture an image through the camera module 211 of the horizontal-posture maintaining apparatus 200, grabbing the handle 302 of the gimbal device 300, while moving. The camera module 211 may be kept in the horizontal posture by rotating in the first and second directions (around the X and Y axes) by means of the first and second drivers (not shown) of the horizontal-posture maintaining apparatus 200.

The operation of the horizontal-posture maintaining apparatus 200 has been described before in detail with reference to FIG. 2 and thus will not be described herein.

Accordingly, when the user moves, grabbing the gimbal device 300, the horizontal-posture maintaining apparatus 200 keeps the camera module 211 in the horizontal posture, correcting the inclination of the camera module 211 in real time. Therefore, a picture or a video may be captured without tremor.

According to various embodiments of the present disclosure, the horizontal-posture maintaining apparatus may be provided in a gimbal device for enabling an image to be captured through the camera module, while enabling the captured image to be viewed at the same time.

According to various embodiments of the present disclosure, the gimbal device may include a mounting portion including an opening for exposing the camera module outward, a handle provided under the mounting portion, and a rotational attachment and detachment unit rotatably connected to a side surface of the handle, for attaching and detaching an electronic device having a viewfinder.

A UAV 400 equipped with the horizontal-posture maintaining apparatus 200 including the camera module 211 according to other various embodiments of the present disclosure will be described below.

Figure 16:
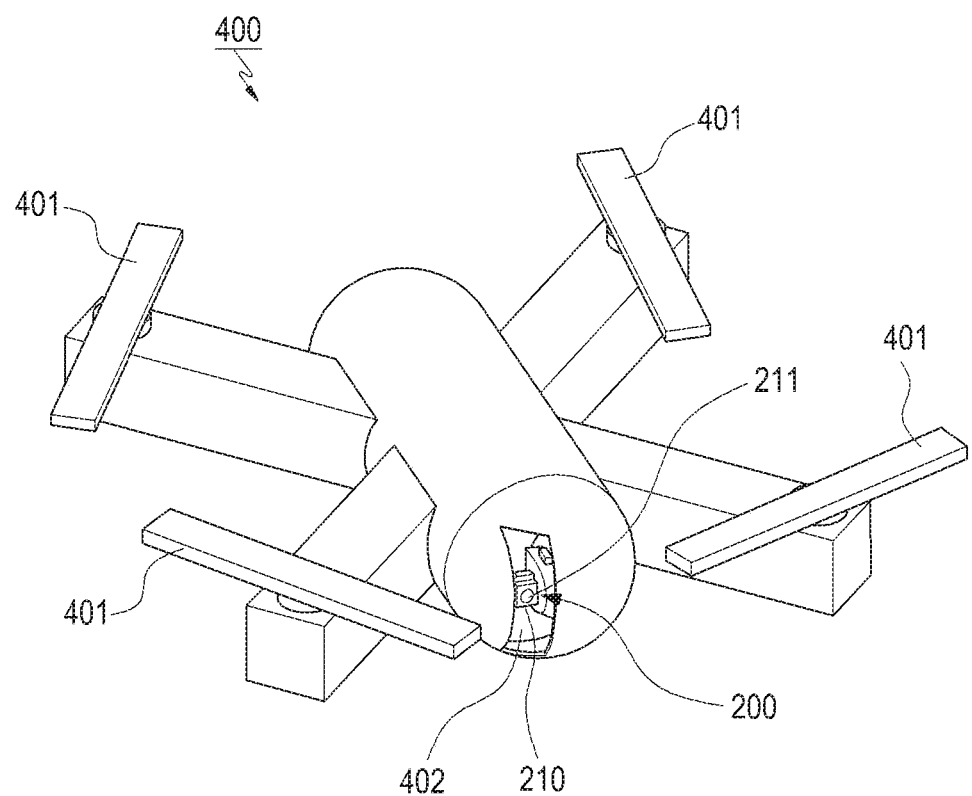
FIG. 16 is a perspective view illustrating an unmanned/uninhabited aerial vehicle (UAV) equipped with the horizontal-posture maintaining apparatus including the camera module according to various embodiments of the present disclosure.

FIG. 16 is a perspective view illustrating the UAV 400 equipped with the horizontal-posture maintaining apparatus 200 including the camera module 211 according to other an embodiment of the present disclosure.

Referring to FIG. 16, the UAV 400 may be equipped with the horizontal-posture maintaining apparatus 200, and may include a plurality of propellers 401. A user may control the propellers 401 by wireless communication, remotely from the ground.

The UAV 400 refers to an air vehicle that is remote-piloted, auto-piloted or semi-auto-piloted in a pre-programmed path, or executes a mission based on self-judgement of an environment, with equipped artificial intelligence. The UAV 400 may be provided with a ground control station/system (GCS), communication equipment, support equipment, and so on. The UAV 400 may include any of a Drone, a remote piloted vehicle (RPV), an unmanned aircraft system (UAS), a remote piloted air/aerial vehicle (RPAV), and a robot aircraft.

A mounting space for mounting the horizontal-posture maintaining apparatus 200 in it may be formed in the UAV 400. The horizontal-posture maintaining apparatus 200 may be provided with the camera barrel 210, and an opening 402 may be formed so that an image may be captured through the camera module 211 of the camera barrel 210. For example, the horizontal-posture maintaining apparatus 200 may be mounted in the mounting space of the UAV 400, and the camera module 211 may be disposed in such a manner that an image may be captured through the opening 402.

In this state, the UAV 400 may be remote-piloted unmanned from the ground by operating the plurality of propellers 401 provided in the UAV 400. The horizontal-posture maintaining apparatus 200 may keep the camera module 211 in the horizontal posture in the unmanned flight state of the UAV 400 by rotating the camera module 211 in the first and second directions (around the X and Y axes).

The operation of the horizontal-posture maintaining apparatus 200 has been described before in detail with reference to FIG. 2 and thus will not be described herein.

Therefore, since the horizontal-posture maintaining apparatus 200 corrects an inclination during unmanned flight of the UAV 400 and thus keeps the camera module 211 in the horizontal posture in the UAV 400, a picture or a video may be acquired without tremor.

According to various embodiments of the present disclosure, the horizontal-posture maintaining apparatus may be installed in an UAV including a plurality of propellers, for flying through remote control of the plurality of propellers from the ground by wireless communication.

According to various embodiments of the present disclosure, a mounting space for mounting the horizontal-posture maintaining apparatus therein, and an opening for allowing the camera module of the horizontal-posture maintaining apparatus to shoot therethrough may be formed in the UAV.

As is apparent from the foregoing description, the horizontal-posture maintaining apparatus according to various embodiment of the present disclosure has both first and second drivers rotating to keep a camera module in horizontal posture, on a side surface of a camera barrel with the camera module built therein, compared to a mechanism of the related art in which the drivers are provided ahead of and on a side surface of the camera module. Therefore, a product size may be reduced and thus the product may be made small and slim. The resulting reduction of vibrations of the camera module that occur during rotation of the camera module makes it possible to capture a picture or an image without tremor.

Furthermore, since both of the first and second drivers are provided on the side surface of the camera module, a flexible PCB (FPCB) may be easily installed in the product.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A horizontal-posture maintaining apparatus comprising:
    a barrel;
    a cover provided on a side surface of the barrel;
    a first driver provided in the cover and configured to rotate the barrel in a first direction (around an X axis) so as to keep the barrel in a horizontal posture;
    a second driver provided in the cover and configured to rotate the cover in a second direction (around a Y axis) so as to keep the barrel in the horizontal posture; and
    at least one processor configured to control the rotation of the first and second drivers,
    wherein the first driver includes a support member supporting to the side surface of the camera barrel; and a first driving motor disposed on a side opposite to the camera barrel with respect to the supporting member,
    wherein the second driver includes a second driving motor provided in the cover and configured to rotate the cover; and a gear unit rotatably engaged with the second driving motor,
    wherein the cover includes a motor case provided in the cover and formed on the exterior of the first driving motor for protecting the first driving motor; and a guide gear unit provided on the exterior of the motor case and comprising a curved surface engaged with the gear unit, and
    wherein the cover is rotatably engaged with the support member and guided to rotate in the second direction along the shape of the guide gear unit.

2. The horizontal-posture maintaining apparatus according to claim 1, wherein the barrel includes a camera barrel with a built-in camera.

3. A horizontal-posture maintaining apparatus having a camera, the apparatus comprising:
    a camera barrel having the camera built therein;
    a cover provided on a side surface of the camera barrel;
    a first driver provided in the cover and configured to rotate the camera barrel in a first direction (around an X axis) so as to keep the camera in a horizontal posture;
    a second driver provided in the cover and configured to rotate the cover in a second direction (around a Y axis) so as to keep the camera in the horizontal posture; and
    at least one processor configured to control the rotation of the first and second drivers,
    wherein the first driver includes a support member supporting to the side surface of the camera barrel; and a first driving motor disposed on a side opposite to the camera barrel with respect to the supporting member,
    wherein the second driver includes a second driving motor provided in the cover and configured to rotate the cover; and a gear unit rotatably engaged with the second driving motor,
    wherein the cover includes a motor case provided in the cover and formed on the exterior of the first driving motor for protecting the first driving motor; and a guide gear unit provided on the exterior of the motor case and comprising a curved surface engaged with the gear unit, and
    wherein the cover is rotatably engaged with the support member and guided to rotate in the second direction along the shape of the guide gear unit.

4. The horizontal-posture maintaining apparatus according to claim 3,
    wherein the cover comprises a front cover and a second cover, and
    wherein an accommodating space for accommodating the first and second drivers is provided in the front cover and the second cover.

5. The horizontal-posture maintaining apparatus according to claim 4, wherein the support member comprises:
    a first bearing container engaged with a rotator formed on a side surface of the camera barrel, and including a first bearing configured to support rotation of the first driving motor in the first direction (around the X axis); and a plurality of second bearing containers including a plurality of second bearings configured to support rotation of the second driving motor in the second direction (around the Y axis).

6. The horizontal-posture maintaining apparatus according to claim 5, wherein the gear unit comprises:
   a first gear engaged with a gear of the second driving motor; and
   a second gear provided in the vicinity of the first gear, and engaged with the guide gear unit.

7. The horizontal-posture maintaining apparatus according to claim 6, further comprising:
   at least one sensor configured to sense movement of the cover,
   wherein the at least one processor is further configured to:
      receive a control signal for maintaining the camera in the horizontal posture according to a sensing signal received from the at least one sensor,
      control rotation of the first and second driving motors by controlling power supply to the first and second drivers based on the control signal, and
      correct rotation of the camera and rotation of the cover.

8. The horizontal-posture maintaining apparatus according to claim 3, wherein the horizontal-posture maintaining apparatus is provided in a gimbal device so as to enable an image to be captured through the camera, while enabling the captured image to be viewed at the same time.

9. The horizontal-posture maintaining apparatus according to claim 8, wherein the gimbal device comprises:
   a mounting portion including an opening for exposing the camera outward;
   a handle provided under the mounting portion; and
   a rotational attachment and detachment unit rotatably connected to a side surface of the handle and configured to attach and detach an electronic device having a viewfinder.

10. The horizontal-posture maintaining apparatus according to claim 3, wherein the horizontal-posture maintaining apparatus is installed in an unmanned aerial vehicle including a plurality of propellers so as to fly through remote control of the plurality of propellers from the ground by wireless communication.

11. The horizontal-posture maintaining apparatus according to claim 10, wherein a mounting space for mounting the horizontal-posture maintaining apparatus therein and an opening for allowing the camera of the horizontal-posture maintaining apparatus to shoot therethrough are formed in the unmanned aerial vehicle.

* * * * *